(12) United States Patent
Todorovic

(10) Patent No.: US 11,326,552 B2
(45) Date of Patent: May 10, 2022

(54) EXHAUST NOZZLE OF A GAS TURBINE ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 329 days.

(21) Appl. No.: 16/719,079

(22) Filed: Dec. 18, 2019

(65) Prior Publication Data

US 2021/0190001 A1     Jun. 24, 2021

(51) Int. Cl.
  *F02K 1/52*   (2006.01)
  *F02K 1/08*   (2006.01)
  *F02K 1/80*   (2006.01)

(52) U.S. Cl.
  CPC .............. *F02K 1/52* (2013.01); *F02K 1/08* (2013.01); *F02K 1/80* (2013.01); *F05D 2220/323* (2013.01)

(58) Field of Classification Search
  CPC ..... F02K 1/52; F02K 1/08; F02K 1/80; F02K 1/04; F01D 25/28
  See application file for complete search history.

(56) References Cited

U.S. PATENT DOCUMENTS

| 6,032,901 | A | * | 3/2000 | Carimali | F01D 25/24 |
| | | | | | 244/129.4 |
| 2013/0019609 | A1 | * | 1/2013 | Wong | F01D 25/162 |
| | | | | | 60/797 |
| 2013/0055725 | A1 | * | 3/2013 | Rauch | F01D 25/28 |
| | | | | | 60/796 |
| 2017/0191447 | A1 | * | 7/2017 | Osman | F02K 1/82 |
| 2019/0331002 | A1 | * | 10/2019 | Eastwood | F02K 1/52 |
| 2020/0291895 | A1 | * | 9/2020 | Alloway | F02C 7/04 |
| 2021/0301761 | A1 | * | 9/2021 | Taylor | F02K 1/58 |
| 2021/0340912 | A1 | * | 11/2021 | Ruthemeyer | F02K 1/80 |

FOREIGN PATENT DOCUMENTS

| DE | 102017130563 A1 | | 6/2019 | | |
| FR | 3008450 A1 | * | 1/2015 | ............... | F01D 9/02 |
| WO | WO-2013163510 A1 | * | 10/2013 | ............... | F23R 3/007 |
| WO | WO-2014058502 A2 | * | 4/2014 | ........... | F01D 25/005 |

* cited by examiner

*Primary Examiner* — Craig Kim
(74) *Attorney, Agent, or Firm* — Shuttleworth & Ingersoll, PLC; Timothy J. Klima

(57) ABSTRACT

An exhaust nozzle of a gas turbine engine includes: a nozzle wall, a centerbody arranged in a flow channel, and two struts connecting the centerbody to the wall. One of the struts is connected to the wall by a coupling arrangement that includes two first brackets and a third bracket, the brackets being spaced in an axial direction and being connected either directly to the wall or to a sliding element that is arranged in a displaceable manner in the wall. The brackets each have a first, highest stiffness in a first direction and smaller stiffnesses in a second and third direction. The brackets are oriented such that with the two first brackets, the first direction is aligned with a circumferential direction of the nozzle and that with the third bracket, the first direction is aligned with the axial direction of the nozzle.

20 Claims, 7 Drawing Sheets

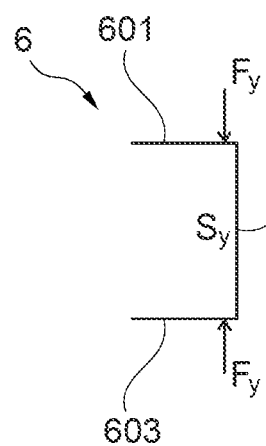 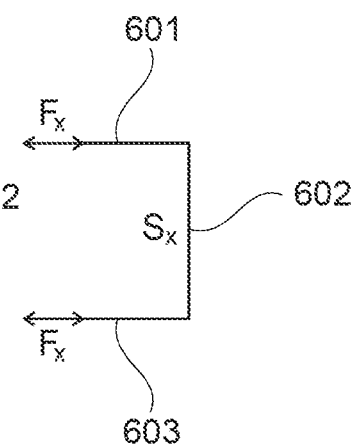 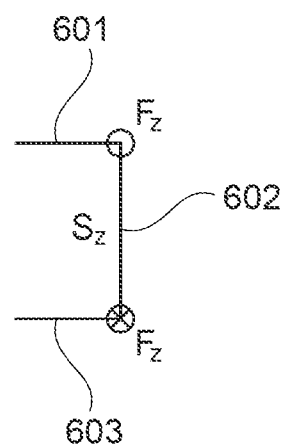
Fig. 3a　　　　Fig. 3b　　　　Fig. 3c
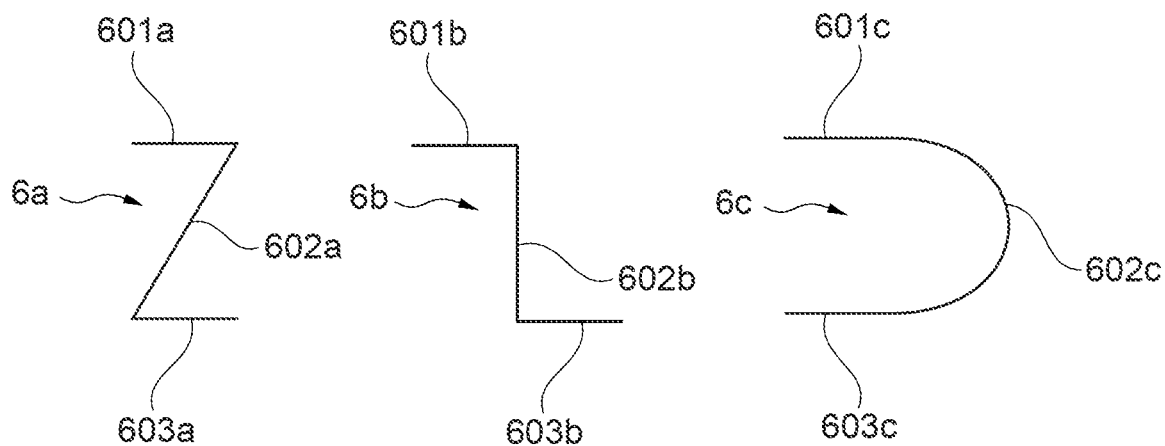
Fig. 4a　　　　Fig. 4b　　　　Fig. 4c

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall.

In such arrangement, the centerbody and the struts are exposed both to the hot core airflow from the primary channel that has passed the core engine and to the colder bypass airflow from the bypass channel, whereas the outer nozzle wall is exposed mostly to the colder bypass airflow. This leads to a different thermal expansion of these components and, accordingly, to thermal stresses acting on these components.

There is thus a need to provide for a variable area exhaust nozzle of a gas turbine engine that comprises a centerbody, wherein the centerbody is integrated into the exhaust nozzle in a manner that allows to compensate for thermal expansion of the centerbody and the struts.

According to an aspect of the invention, an exhaust nozzle for a gas turbine engine is provided, wherein the exhaust nozzle comprises a nozzle wall, a flow channel which is limited radially outwards by the nozzle wall, a centerbody arranged in the flow channel, and at least two struts connecting the centerbody to the nozzle wall. At least one of the struts is connected to the nozzle wall by a coupling arrangement that comprises at least two first brackets and at least one third bracket, the brackets being spaced in the axial direction, and each bracket having a first end, a second end, and a bendable surface in between the ends, wherein the first end is connected to the strut and the second end is connected either directly to the nozzle wall or to a sliding element that is arranged in a displaceable manner in the nozzle wall.

The brackets each have—due to their form—a first, highest stiffness in a first direction and smaller stiffnesses a second and a third direction, wherein the first, second and third directions are perpendicular to each other.

It is provided that the brackets are oriented such between the strut and the nozzle wall or sliding element that with the at least two first brackets the first direction in which the stiffness is highest is aligned with the circumferential direction of the nozzle and that with the at least one third bracket the first direction in which the stiffness is highest is aligned with the axial direction of the nozzle.

Aspects of the invention are thus based on the idea to arrange at least three brackets between the strut and the nozzle wall or a sliding element slidably arranged in the nozzle wall in order to compensate for thermal expansion of the struts and of the centerbody, wherein of the at least three brackets two brackets are oriented different than a third bracket such that a high stiffness is achieved with respect to forces that act in the axial and circumferential direction of the nozzle and that a low stiffness is achieved with respect to forces that act in the radial direction of the nozzle. Accordingly, a radial movement between the strut and the nozzle wall or the sliding element is enabled to compensate for thermal expansion, but an axial or circumferential displacement is substantially hindered. At the same time, as there are provided at least two brackets oriented in the same manner and forming a bracket system, torsional moments acting on the centerbody and struts are also reacted.

To achieve this, with at least two of the brackets (the first brackets), the direction of the brackets in which the stiffness is highest (the first stiffness) is aligned with the circumferential direction. With at least one bracket (the third bracket), the direction of the bracket in which the stiffness is highest (the first stiffness) is aligned with the axial direction.

Thereby, the at least two first brackets will be forgiving in the radial direction and the axial direction, whilst being much stiffer in the circumferential direction. The at least one third bracket will be forgiving in the radial direction and the circumferential direction but is much stiffer in the axial direction. In sum, this allows only for a radial relative movement such that thermal expansion of the centerbody and of the struts can be compensated for.

Further, having at least three brackets per strut, these brackets also constrain torsional moments.

It is pointed out that, with a bracket, the stiffness in a particular direction is the stiffness of the bracket when a force is applied in the particular direction between the ends of the bracket. The stiffness depends on the product of the modulus of elasticity of the material and the second moment of area of the cross-section in the considered direction. The second moment of area depends on the expansion of the body in the direction of the force applied and, accordingly, for a bracket with thin walls is highly different in different directions.

In an embodiment, the bendable surface of the first brackets which are aligned with their first direction in the circumferential direction extends in the radial and circumferential directions. The bendable surface of the at least one third bracket which is aligned with its first direction in the axial direction extends in the radial and axial directions. The bendable surface may be a flat or plate-like surface, its thickness being much smaller than its extension.

In embodiment, the at least one third bracket is located between two of the at least two first brackets in the axial direction. This provides for a sufficient axial distance between the at least two first brackets to effectively react torsional moments.

In an embodiment, the ends of two of the first brackets are pointing towards each other in the axial direction. However, the ends may be pointing in the same direction alternatively.

In a further embodiment, the brackets may have a different radial length to compensate for a different radial distance between the strut and the nozzle wall at different axial locations.

In an embodiment, the ends of the brackets are formed by surfaces that are angled or bent with respect to the bendable surface of the bracket. The ends of the brackets may consist of the same material and have the same thickness as the bendable surface. They may also have the same width as the bendable surface.

The brackets may have a plurality of forms. Examples include C-shaped brackets, Z-shaped brackets and U-shaped brackets, wherein the ends of the respective "C", "Z" and "U" are connected to the strut and the nozzle wall or the sliding element, respectively, and wherein the surface between these ends forms the bendable surface.

In an embodiment, the brackets are connected at the nozzle wall side to the sliding element, wherein the sliding element is arranged in a receiving slot that extends in the axial direction in the nozzle wall. Such an arrangement allows to move the struts and, accordingly, the centerpiece in the axial direction of the nozzle. Accordingly, when the brackets at their second end are connected to the sliding element, the centerbody and the struts are axially movable in the nozzle. On the other hand, when the brackets at their second end are connected directly to the nozzle wall, the centerbody and the struts are actually fixed in the nozzle.

The brackets may consist of a plurality of materials which have good elastic properties that allow the brackets to return into their original position after having received a force. In embodiments, the brackets consist of a metal, a metal alloy or a composite material such as a carbon fiber reinforced polymer.

The brackets may have a width in the range between 60 mm and 100 mm. They may have a thickness in the range between 0.5 mm and 3 mm. The brackets may be formed of sheet metal.

In an embodiment, there are provided exactly three brackets at each coupling arrangement between one of the struts and the nozzle wall or the sliding element. Accordingly, two first brackets and one third bracket are provided. A total of three brackets per strut is sufficient to realize all required functions. However, further brackets may be provided to improve the mechanical strength of the connection between the strut and the nozzle wall.

The centerbody may be fixed to the fixed outer nozzle wall or may be movable relative to the fixed outer nozzle wall.

In an embodiment, the nozzle comprises exactly two struts. The two struts may be arranged approximately in a plane. In such case, such plane defines a lateral direction, wherein the radial direction is identical to the lateral direction. Single or multiple struts are possible as well as alternative embodiments.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the centerbody relative to the outer nozzle wall, the degree of expansion of the flow channel behind the nozzle throat area, i.e. the ratio of A9 to A8, can be adjusted.

According to an embodiment, the nozzle is the nozzle of a supersonic gas turbine engine which is designed for operating conditions in the subsonic, transonic and supersonic ranges.

It should be noted that, when referring to a movement in the axial direction, the movement can be both in the axial direction and against the axial direction, i.e., back and forth.

It should be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which:

FIGS. 3a-3c show a C-shaped bracket and forces acting on such bracket in x-direction, y-direction and z-direction;

FIGS. 4a-4c show three alternative forms of a bracket;

Figure 5:
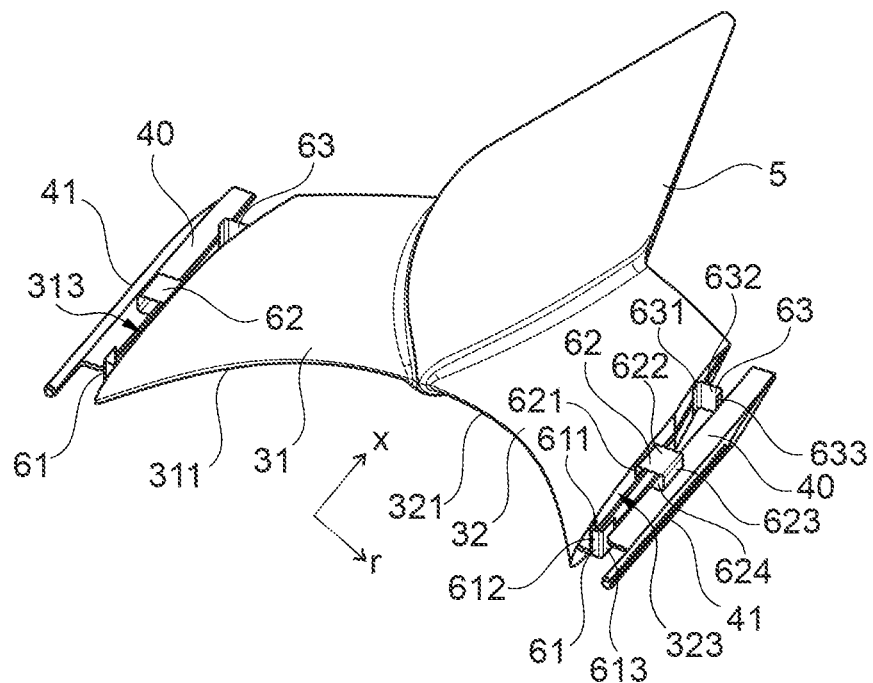
FIG. 5 is a perspective view of parts of a nozzle that comprises two struts connecting a centerbody to a nozzle wall by means of a coupling arrangement that comprises three brackets, wherein the highest stiffness of two of the brackets is in the circumferential direction and the highest stiffness of the remaining bracket is in the axial direction.
Figure 6:
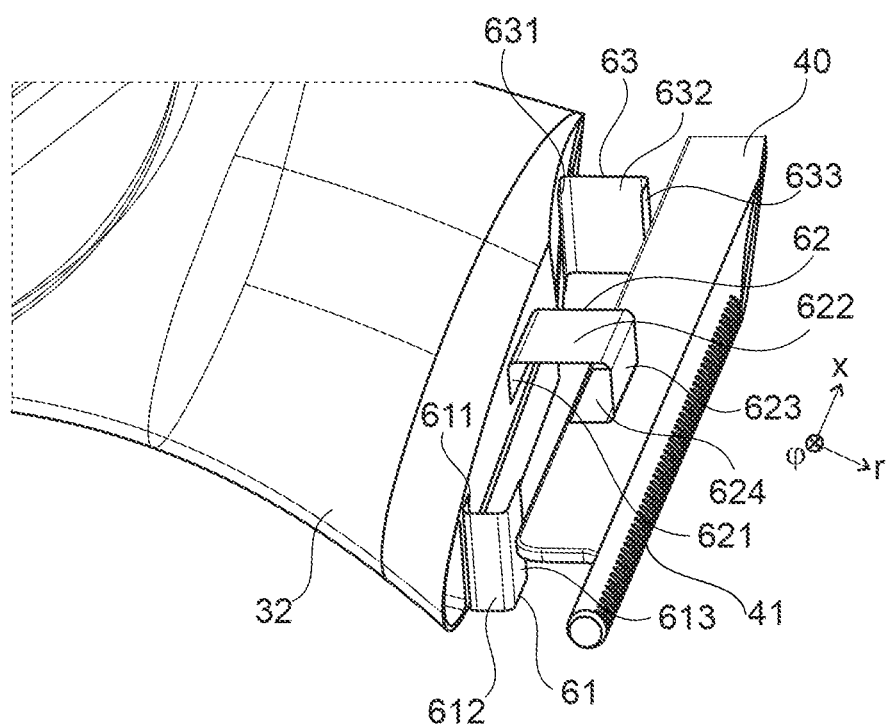
Figure 7:
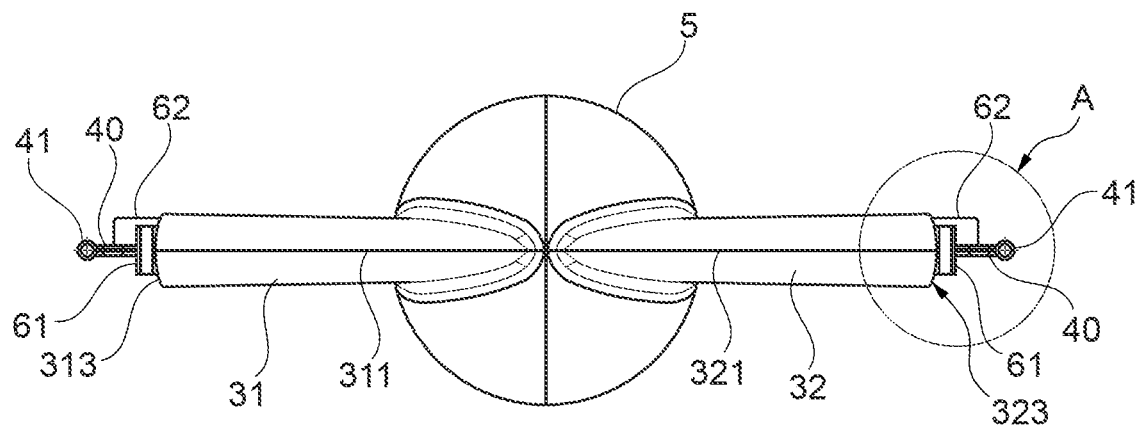
Figure 8:
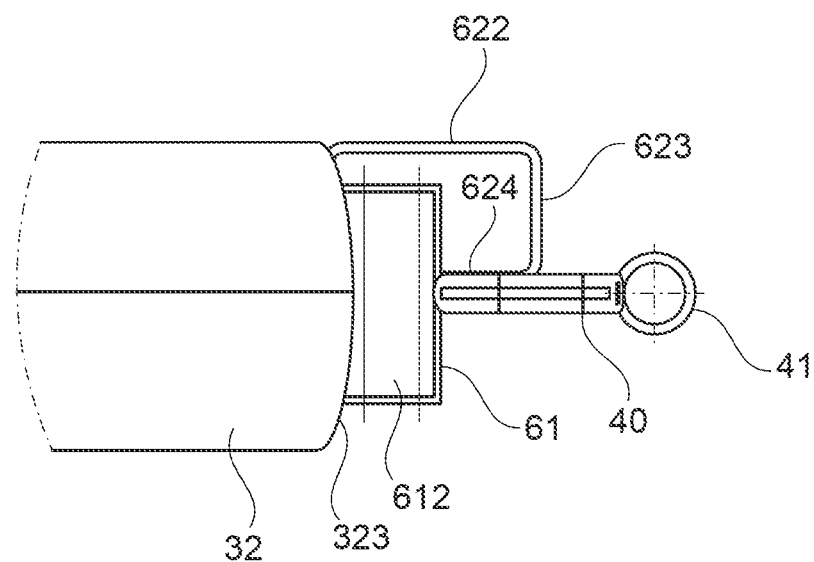
Figure 9:
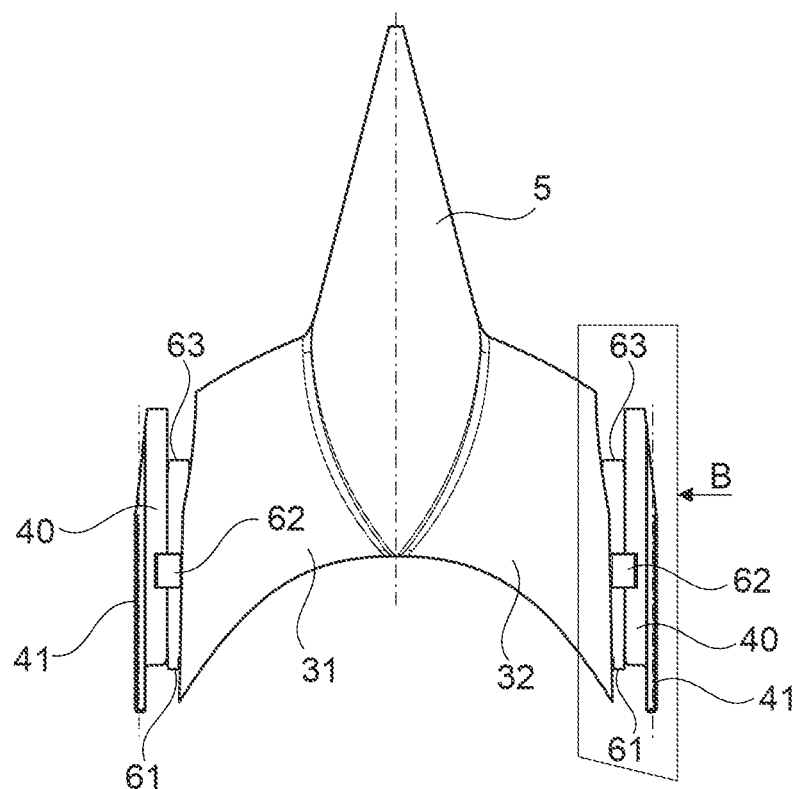
Figure 10:
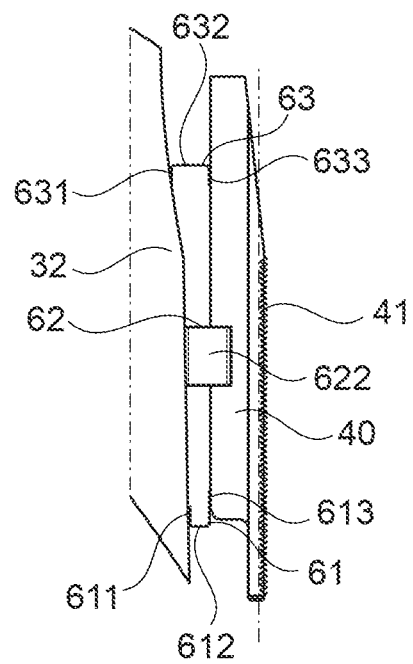

FIG. 6 an enlarged view of the coupling arrangement and the brackets of FIG. 5;

FIG. 7 is a front view of the nozzle of FIG. 5;

FIG. 8 is an enlarged view of area A of FIG. 7;

FIG. 9 is a top view of the nozzle of FIG. 5;

FIG. 10 is an enlarged view of area B of FIG. 9; and

Figure 11:
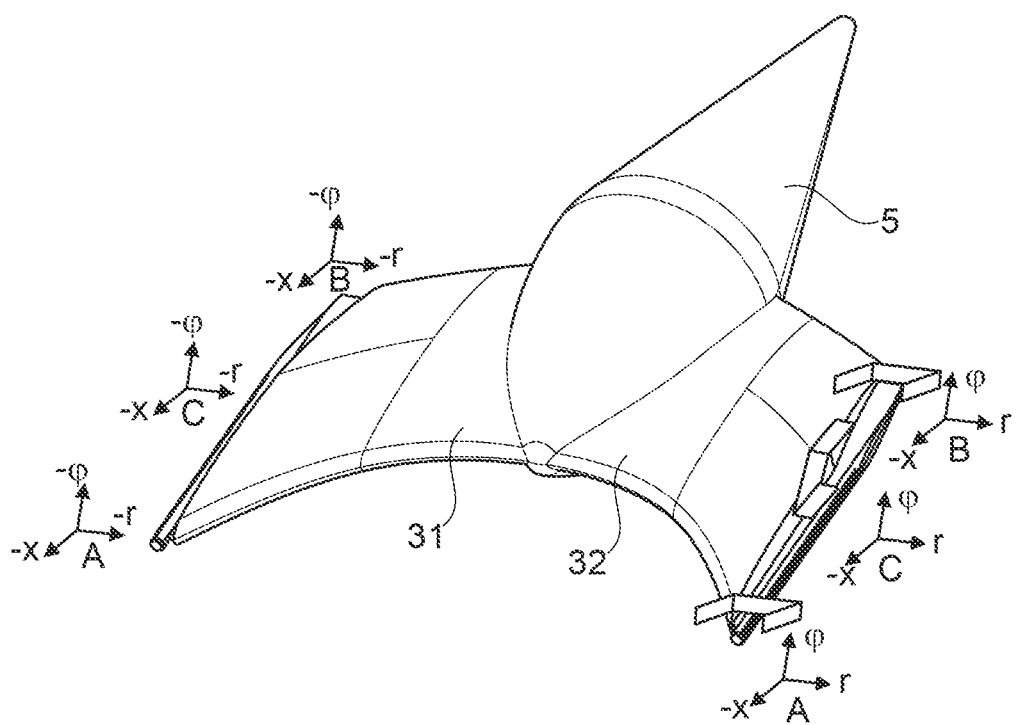

FIG. 11 is a perspective view of the nozzle similar to FIG. 5 indicating schematically the movements between the struts and the nozzle wall that the respective brackets allow and reject.

Figure 1:
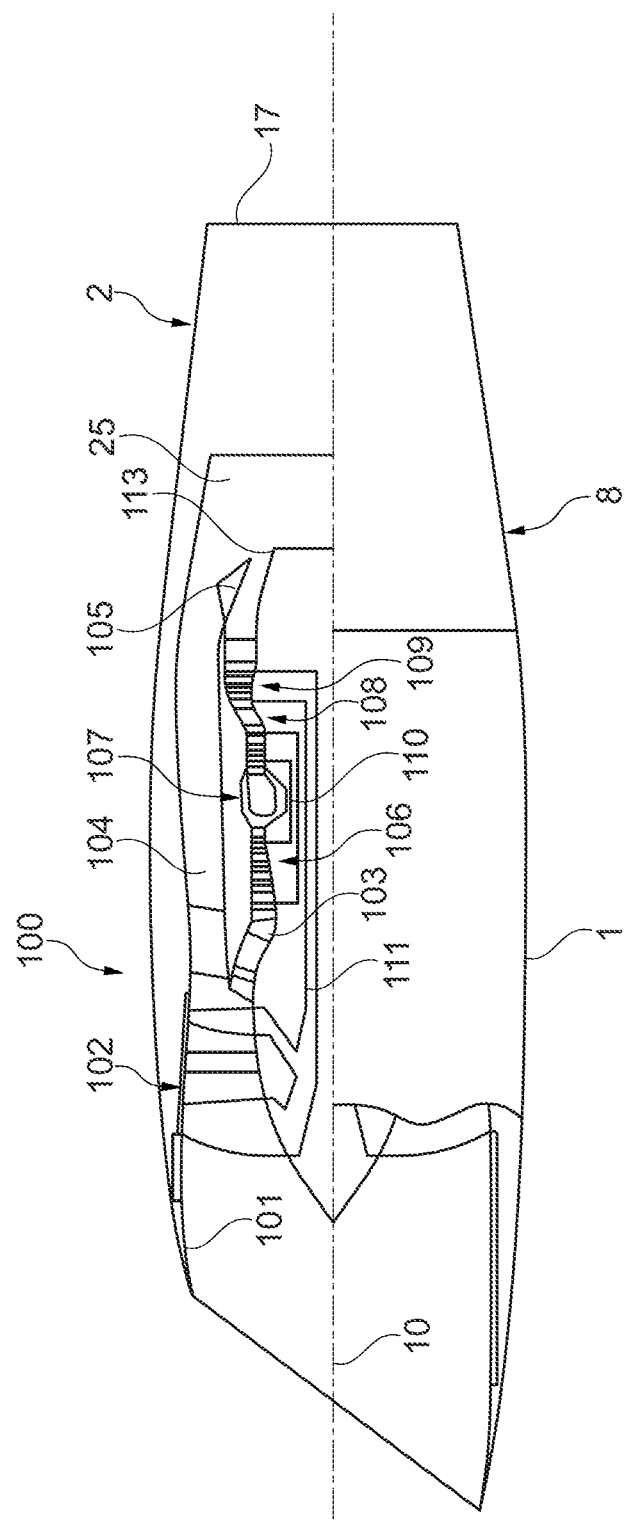
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

Figure 2:
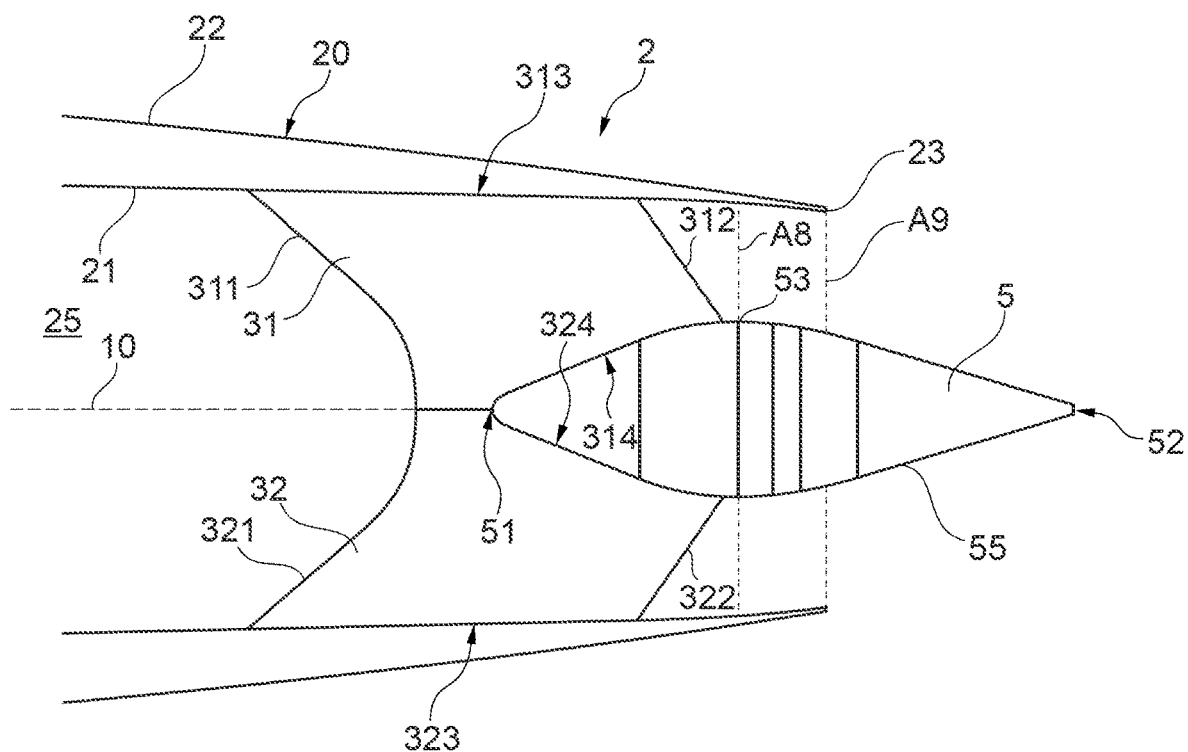
FIG. 2 is a sectional view of an example of an exhaust nozzle that comprises a centerbody that is connected via two struts to an outer nozzle wall.

In the context of this invention, the design of the nozzle 2 is of relevance. FIG. 2 shows schematically the basic design of the nozzle 2 in a sectional view that contains the engine centerline 10. Nozzle 2 comprises an outer nozzle wall 20 formed by an inner wall 21 and an outer wall 22. The inner wall 21 forms the radially outer boundary of a flow channel 25 through the nozzle 2. The outer wall 22 is formed radially outside to the inner wall 21 and adjoins the surroundings. The inner wall 21 and the outer wall 22 may converge at a point downstream to form a nozzle exit edge 23 at their downstream end.

The nozzle 2 also includes a centerbody 5, which forms a surface 55. The centerbody 5 has a longitudinal axis identical to the engine centerline 10. The centerbody 5 forms an upstream end 51, a downstream end 52 and a maximum 53 of its cross-sectional area between the upstream end 51 and the downstream end 52. In the example shown, but not necessarily, the centerbody 5 is conical adjacent to its upstream end 51 and towards its downstream end 52.

The nozzle 2 forms a nozzle throat area A8 where the cross-sectional area between centerbody 5 and inner wall 21 is minimum. Typically, the axial position of the nozzle throat area A8 is defined by the axial position of the maximum 53 of the centerbody 5. However, this is not necessarily the case. At the nozzle exit edge 23, the thrust nozzle forms a nozzle exit area A9. This area is equal to the difference between the cross-sectional area formed by the inner wall 21 at the nozzle exit edge 23 and the cross-sectional area of the centerbody 5 in the plane under consideration. The ratio A9 to A8 defines the degree of expansion of the flow channel 25 behind the nozzle throat area A8.

The nozzle 2 further comprises two struts 31, 32 connecting the centerbody 5 to the nozzle wall 20, namely, the inner wall 21. They extend from the centerbody 5 in a radial direction through the flow channel 25 to the nozzle wall 20. The struts 31, 32 each have a profile with a front edge 311, 321 and a rear edge 312, 322, as well as an upper side and a lower side. Each strut 31, 32 has a radially outer end 313, 323 at which it is connected to the inner wall 21 and a radially inner end 314, 324 at which it is connected to the centerbody 5.

The struts 31, 32, which may also be referred to as wings, are approximately arranged in a plane containing the engine centerline 10. An arrangement of the struts "approximately" in a plane exists insofar as the struts have a three-dimensional extension corresponding to the profile they form. Furthermore, in embodiments, it may be provided that the two struts 31, 32 are arranged at an angle to each other.

The centerbody 5 is fixed to the struts 31, 32. In one embodiment, the struts 31, 32 are fixed to the outer nozzle wall 20 so that the centerbody 5 cannot be displaced axially relative to the outer nozzle wall 20. In an alternative design, the struts 31, 32 can be displaced relative to the outer nozzle wall 20. In such case, actuators are provided that interact with the struts 31, 32 to provide for an axial movement of the struts.

The centerbody may be a modulated centerbody, the cross-section of which varies along the axial direction, wherein the cross-section may have one or several maxima.

In case both struts 31, 32 are rigidly connected to the outer nozzle wall 20, thermal expansion of the struts 31, 32 and of the centerbody 5 leads to thermal stresses between the struts 31, 32 and the outer nozzle wall 20.

According to the present disclosure, there is provided not a stiff, but a resilient connection between the nozzles 31, 32 and the nozzle wall 20. To this end, a coupling arrangement is provided that connects the nozzles 31, 32 to the nozzle wall 20. This coupling arrangement comprises at least three brackets. In the embodiment that is be described in the following, the coupling is effected by exactly three brackets, although more brackets may be used.

Before discussing the coupling arrangement, examples of brackets that can be used for such coupling arrangement and some of their features are discussed with respect to FIGS. 3a to 3c and FIGS. 4a to 4c. FIGS. 3a to 3c show a C-shaped bracket that comprises a bendable flat or plate-like surface 602 and two ends or end surfaces 601, 603 which are connected substantially at right angles to the surface 602. As all surfaces 601, 602, 603 of the bracket 6 consist of the same material, have the same thickness and also may have the same width (perpendicular to the drawing plane), all of these surfaces may be bent under a force that reacts upon them. However, in the context of the present disclosure, as will be discussed in more detail with respect to FIGS. 5 to 11, the end surfaces 601, 602 are connected to the strut and to the nozzle wall, respectively. Accordingly, the surface that experiences most deformation/bending in reaction to a force is the surface 602, which, therefore, is referred to as bending surface.

FIG. 3a considers the situation that a force $F_y$ is applied in the y-direction to the ends 601, 603 of the bracket 6. In reaction to such a force $F_y$, the surface 602 experiences a deformation/bending. The extent to which the surface 602 is bent depends on the stiffness $S_y$ of the bracket 6 in the y-direction, i.e., the stiffness of the bracket when a force $F_y$ is applied in the y-direction to the ends 601, 603 of the bracket (wherein a force $F_y$ may be applied on one or on both ends). The stiffness $S_y$ is a bending stiffness in particular. The stiffness $S_y$ in the y-direction depends on the modulus of elasticity of the bracket material and the second moment of area of the cross-section in the considered direction. As is obvious, this stiffness $S_y$ is relatively low in the y-direction, such that the surface 602 will yield to the force $F_y$ and experience bending.

FIG. 3b considers the situation that a force $F_x$ is applied in the x-direction to the ends 601, 603 of the bracket. In reaction to such a force $F_x$, the surface 602 experiences a deformation/bending. The extent to which the surface 602 is bent depends on the stiffness $S_x$ of the bracket 3 in the x-direction, i.e., the stiffness of the bracket when a force $F_x$ is applied in the x-direction to the ends 601, 603 of the bracket (wherein a force $F_x$ may be applied on one or on both ends). The stiffness $S_x$ is a bending stiffness in particular. The stiffness $S_x$ in the x-direction is also relatively low, as the second moment of area is small again, such that the surface 602 will yield to the force $F_x$ and experience bending.

FIG. 3c considers the situation that a force $F_z$ is applied in the z-direction to the ends 601, 603 of the bracket. In reaction to such a force $F_z$, the surface 602 experiences a deformation/bending that, however, is minimal. The extent to which the surface 602 is bent depends on the stiffness $S_z$ of the bracket 3 in the z-direction, i.e., the stiffness of the bracket when a force $F_z$ is applied in the z-direction (i.e., into/out of the drawing plane) to the ends 601, 603 of the bracket (wherein a force $F_z$ may be applied on one or on both ends). The stiffness $S_z$ is a stiffness against skewing in the plance of the surface in particular. The stiffness $S_z$ in the z-direction is much higher (at least by a factor of 5 or 10 or 100) than in the other directions, as the second moment of area is much higher as well, such that the surface 602 will react to the force $F_z$ and not experience any substantial bending. When determining the second moment of area for $S_z$, the surface area and not the thickness of the surface 602 is relevant.

Accordingly, the stiffness in the z-direction is much higher than the stiffness in the x-direction and the y-direction: $S_z \gg S_x$ and $S_z \gg S_y$.

FIGS. 4a-4c show a few different possible forms of the bracket, namely, two Z-shaped brackets 6a, 6b and one U-shaped bracket 6c, wherein the respective ends 601a, 601b, 601c and 603a, 603b, 603c are connected to the strut and to the nozzle wall, respectively.

FIGS. 5 to 10 show in a plurality of views an embodiment of the connection of the struts 31, 32 to the nozzle wall by means of three brackets 61, 62, 63. In this respect, initially, it is pointed out that the brackets 61, 62, 63 are not connected directly to the nozzle wall, but are instead connected to a sliding element 40 which is arranged in a receiving slot (not shown) that extends in the axial direction in the nozzle wall. The sliding element 40 comprises a toothing 41 that interacts with an actuator (not shown). Such actuator may comprise a worm screw that interacts with the toothing 41 of the sliding element 40. In such case, the actuator and the toothing of the sliding element form a worm and rack drive. However, the provision of a toothing 41 in the sliding element 40 is exemplary only, and any means to displace the sliding element 40 in a respective receiving slot in the nozzle wall may be implemented.

Further, in case the centerbody 5 and the struts 31, 32 are fixed to the nozzle wall, the provision of a sliding element 40 is not required and the brackets 61, 62, 63 may be connected directly to the nozzle wall.

The orientation and connection of the brackets 61, 62, 63 will be discussed with respect to the coupling connection between the right hand strut 32 and the corresponding sliding element 40. The connection of the left hand strut 31 to the corresponding slide element 40 is the same.

Referring in particular to FIGS. 5, 6, 8 and 10, the three brackets 61, 62, 63 are arranged one behind the other in the axial direction, with an axial space in between the brackets. The most upstream bracket is bracket 61, the most downstream bracket is bracket 63 and bracket 62 is in between bracket 61 and bracket 63.

Each of the brackets 61, 62, 63 is C-shaped as discussed with respect to FIGS. 3a-3c. However, the form of the brackets as C-shaped is to be understood as an example only. Other forms of brackets are possible, some of which have been discussed with respect to FIGS. 4a to 4c.

Each bracket 61, 62, 63 comprises a first end 611, 621, 631 connecting the bracket to the radially outer end 323 of the strut 32. It further comprises a second end 613, 623, 633, which connects the bracket to the sliding element 40 or, more generally, to the nozzle wall. In this respect, it is pointed out that the second end 623 of the middle bracket 62 comprises an extension surface 624 bent 90 degrees inwards with respect to the second end 623 to provide for a better connection to the upper surface of the sliding element 40. This, however, is in implementation detail only.

In between the respective ends, a bending surface 612, 621, 631 of the three brackets is provided. With the most upstream bracket 61 and the most downstream bracket 63, the bending surface 612, 631 extends both in the radial and the circumferential directions. With the middle bracket 62, bending surface 622 extends in the radial and axial directions.

Due to the different stiffnesses that the brackets 61, 62, 63 have in the different directions, as discussed with respect to FIGS. 3a-3c, this implies that the front and rear brackets 61, 63 have the highest stiffness aligned with the circumferential direction, wherein the middle bracket 62 has its highest stiffness aligned with the axial direction. In this respect, it is pointed out that FIGS. 3a-3c used its own Cartesian coordinate system with the three spatial directions x, y, z. When applying the brackets in the nozzle, these three spatial directions correspond to the axial, radial and circumferential directions in the cylindrical coordinate system used to describe the nozzle, wherein the axial direction is the same, y corresponds to the radial direction r, and z corresponds to the circumferential direction φ.

Due to this orientation of the brackets, the front and rear brackets 61, 63 are forgiving (soft) in the axial direction and the radial direction. However, they are much stiffer in the circumferential direction. This way, a displacement between the strut 32 and the nozzle wall in the circumferential direction is hindered and the respective forces are reacted, thereby constraining the centerbody 5 against rotation around the axial direction. The middle bracket 62 is forgiving (soft) in the radial direction and to some extent in the circumferential direction, but much stiffer in the axial direction. This way, a displacement between the strut 32 and the nozzle wall in the axial direction is hindered and the respective forces are reacted. All the brackets 61, 62, 63, however, are forgiving (soft) in the radial direction such that the brackets can compensate thermal expansion of the struts 31, 32 and the centerbody 5.

As can be seen, e.g., in FIGS. 5, 9 and 10, the radial distance between the radially outer end 323 of the strut 32 and the sliding element 40 may vary. To compensate for this, the brackets 61, 62, 63 have a different radial length. However, this is an implementation detail only.

Further, as can be seen, e.g., in FIGS. 5 and 6, the end walls 611, 613 of front bracket 61 and the end walls 631, 632 of the rear bracket 63 are pointing towards each other (pointing in and against the axial direction). However, this is not necessarily the case and, alternatively, they may all point in or against the axial direction. Further, the surface size of the ends 611, 613 may be different. The exact surface size of the ends may depend on the available space and the required connecting surface between the end and the respective element.

By providing brackets which have their highest stiffness oriented in different directions, also a protection against torsional moments is provided for, as is discussed with respect to FIG. 11. FIG. 11 schematically indicates the movements that the respective brackets located between the struts 31, 32 and the nozzle wall allow and react. As already discussed, the front and rear brackets 61, 63 allow movements in the axial and radial directions but react movements in the circumferential direction. The middle brackets 62 allows movements in the radial and circumferential direction but react movements in the axial direction. This leads to constraints A, B, C at both sides, indicated schematically in FIG. 11.

The combination of constraints A & B creates a constraint for a rotation of the centerbody 5 and struts 31, 32 around the radial direction. The combination of constraints A & A and B & B creates a constraint for a rotation of the centerbody 5 and struts 31, 32 around the axial direction. The combination of constraints C & C creates a constraint for a rotation of the centerbody 5 and struts 31, 32 around the tangential direction. Accordingly, all torsional moments are reacted as well.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
   a nozzle wall,
   a flow channel which is limited radially outwards by the nozzle wall,
   a centerbody arranged in the flow channel, and
   at least two struts connecting the centerbody to the nozzle wall,
   wherein at least one of the at least two struts is connected to the nozzle wall by a coupling arrangement that comprises brackets, including at least two first brackets and at least one third bracket, the brackets being spaced in an axial direction, each of the brackets having a first end, a second end, and a bendable surface in between the first and second ends, wherein the first end is connected to the at least one of the at least two struts and the second end is connected either directly to the nozzle wall or to a sliding element that is arranged in a displaceable manner in the nozzle wall,
   wherein the brackets each have a first, highest stiffness in a first direction and smaller stiffnesses in a second direction and a third direction, wherein the first, second and third directions are perpendicular to each other,
   wherein the brackets are oriented such that with the at least two first brackets, the first direction in which the stiffness is highest is aligned with a circumferential direction of the nozzle and that with the at least one third bracket, the first direction in which the stiffness is highest is aligned with the axial direction of the nozzle.

2. The nozzle of claim 1, wherein the bendable surface of the at least two first brackets extends in a radial direction and the circumferential direction.

3. The nozzle of claim 1, wherein the bendable surface of the at least one third bracket extends in a radial direction and the axial direction.

4. The nozzle of claim 1, wherein the at least one third bracket is located between two of the at least two first brackets in the axial direction.

5. The nozzle of claim 1, wherein the first and second ends of two of the at least two first brackets point towards each other in the axial direction.

6. The nozzle of claim 1, wherein the brackets have a different radial length to compensate for a different radial distance between the at least one of the at least two struts and the nozzle wall at different axial locations.

7. The nozzle of claim 1, wherein the first and second ends of the brackets are formed by surfaces that are angled or bent with respect to the bendable surface.

8. The nozzle of claim 1, wherein at least one of the brackets is C-shaped.

9. The nozzle of claim 1, wherein at least one of the brackets is Z-shaped.

10. The nozzle of claim 1, wherein at least one of the brackets is U-shaped.

11. The nozzle of claim 1, wherein the brackets are connected at the nozzle wall side to a sliding element, wherein the sliding element is arranged in a receiving slot that extends in the axial direction in the nozzle wall.

12. The nozzle of claim 11, wherein the at least one third bracket comprises at one chosen from the first and second ends, an extension surface connected to a flat surface of the sliding element.

13. The nozzle of claim 1, wherein the brackets consist of a metal or a metal alloy.

14. The nozzle of claim 1, wherein the brackets consist of a nickel-chromium-molybdenum alloy.

15. The nozzle of claim 1, wherein the brackets have a width in a range between 60 mm and 100 mm.

16. The nozzle of claim 1, wherein the brackets have a thickness in a range between 1 mm and 4 mm.

17. The nozzle of claim 1, wherein there are provided exactly three brackets at each coupling arrangement between one of the struts and the nozzle wall.

18. The nozzle of claim 1, wherein the nozzle comprises exactly two struts.

19. The nozzle of claim 1, wherein the nozzle has a convergent-divergent cross-section.

20. The nozzle of claim 1, wherein the nozzle is configured as the nozzle of a supersonic gas turbine engine.

* * * * *